(No Model.) 4 Sheets—Sheet 1.
J. TAYLOR.
WATER TUBE BOILER.
No. 406,376. Patented July 2, 1889.
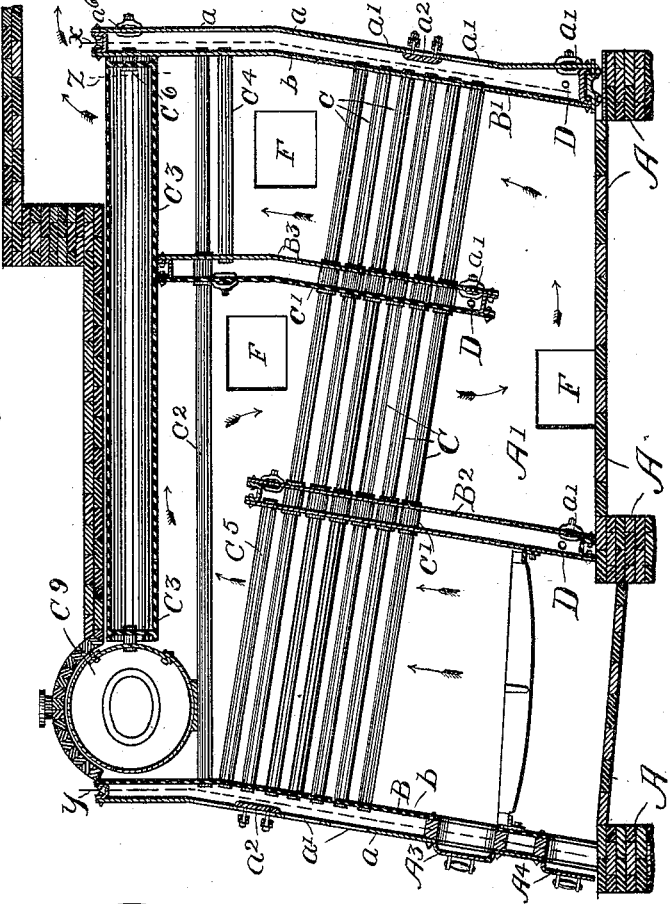
Witnesses
S. Davenport
C. J. Faulkner
Inventor
John Taylor
by Geo. A. Mosher
Attorney (No Model.) 4 Sheets—Sheet 2.

J. TAYLOR.
WATER TUBE BOILER.

No. 406,376. Patented July 2, 1889.

Witnesses
N. Dampol
C. T. Faulkner

Inventor
John Taylor
by Geo. A. Mosher
Attorney (No Model.) 4 Sheets—Sheet 3.
J. TAYLOR.
WATER TUBE BOILER.
No. 406,376. Patented July 2, 1889.
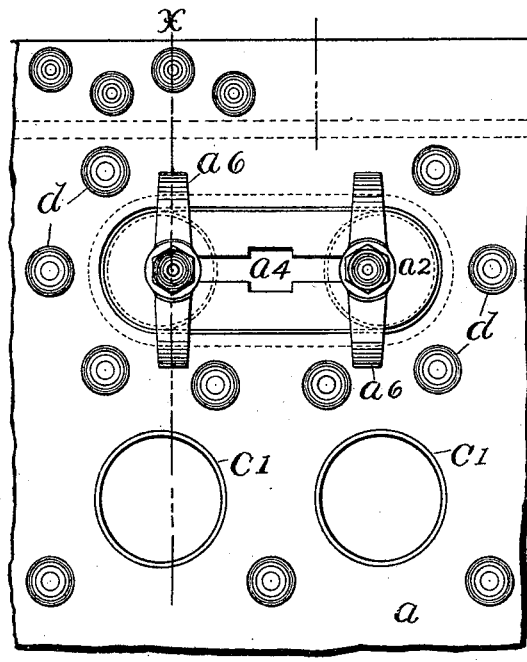
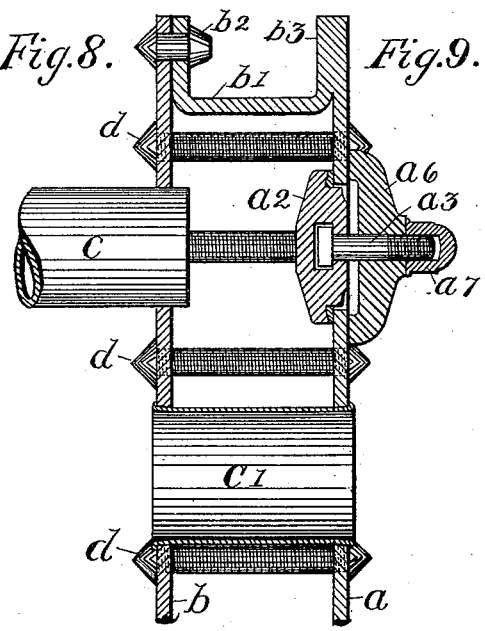
Fig. 8. Fig. 9.
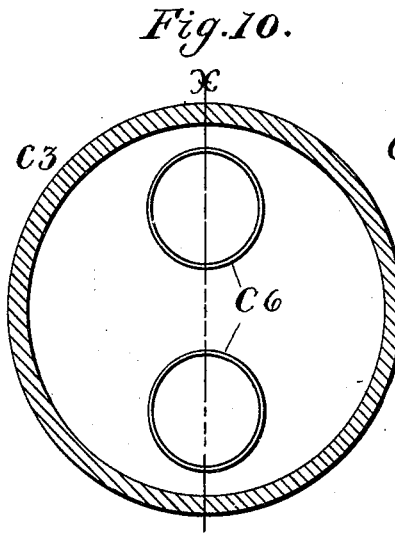
Fig. 10.
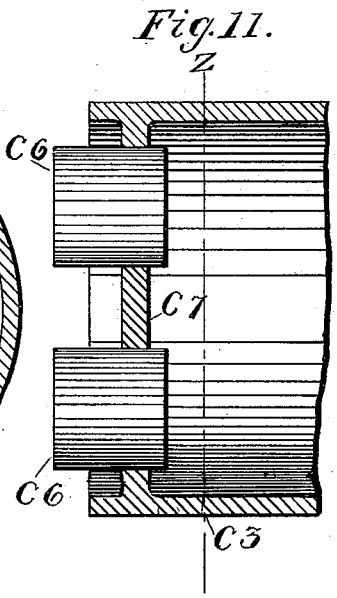
Fig. 11.
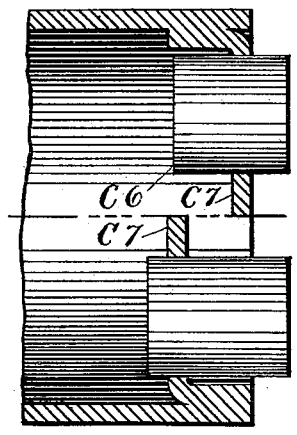
Fig. 12.
Witnesses
N. Davenport
C. T. Faulkner
Inventor
John Taylor
by Geo. A. Mohun
Attorney
N. PETERS, Photo-Lithographer, Washington, D. C.

(No Model.) 4 Sheets—Sheet 4.

J. TAYLOR.
WATER TUBE BOILER.

No. 406,376. Patented July 2, 1889.

Witnesses
N. Davenport
C. T. Faulkner

Inventor
John Taylor
by Geo. M. Cooher
Attorney

UNITED STATES PATENT OFFICE.

JOHN TAYLOR, OF TROY, NEW YORK.

WATER-TUBE BOILER.

SPECIFICATION forming part of Letters Patent No. 406,376, dated July 2, 1889.

Application filed June 2, 1888. Serial No. 275,900. (No model.)

*To all whom it may concern:*

Be it known that I, JOHN TAYLOR, a resident of the city of Troy, in the county of Rensselaer and State of New York, have invented certain new and useful Improvements in Water-Tube Boilers; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

My invention relates to improvements in water-tube boilers; and it consists of the novel construction and combination of parts, hereinafter described, and pointed out in the claims.

Figure 4:
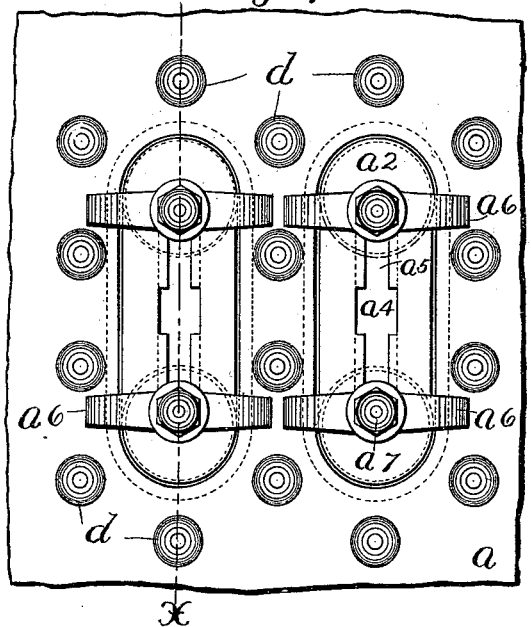
Figure 5:
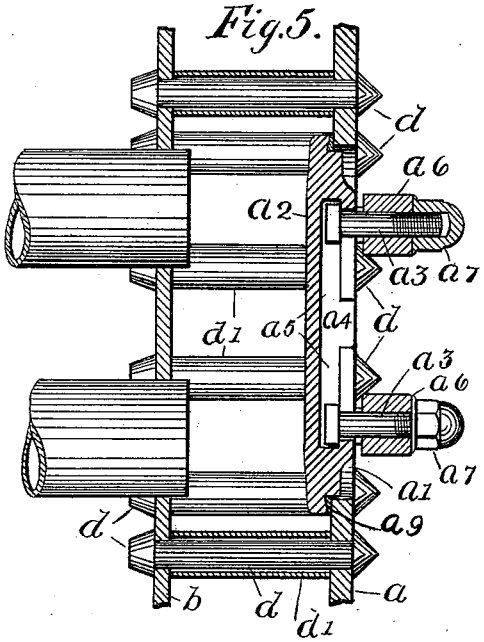
Figure 6:
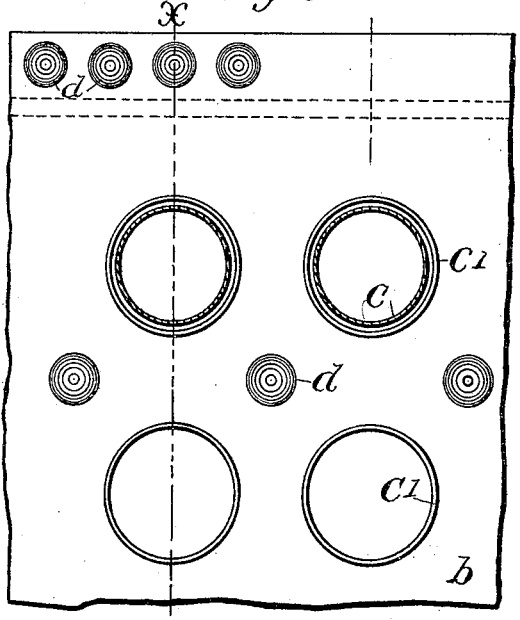
Figure 7:
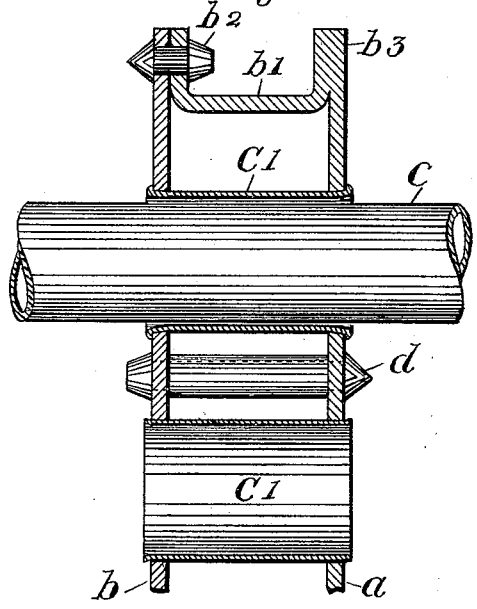
Figure 13:
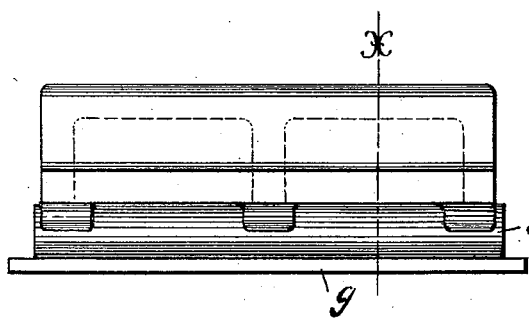
Figure 14:
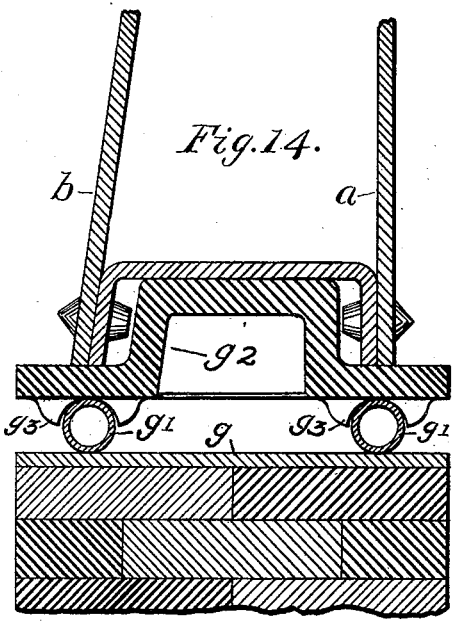
Figure 16:
Figure 15:
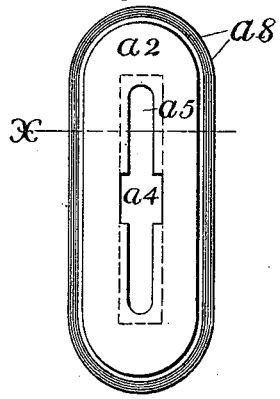
Figure 17:
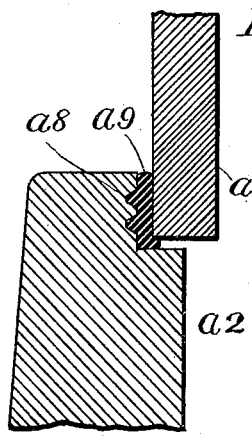
Figure 18:
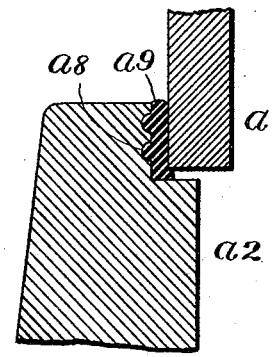

Figure 1 of the drawings is a vertical longitudinal section of the boiler. Fig. 2 is a front end elevation of the boiler, partly in section, on the broken line $y$ in Fig. 1. Fig. 3 is a rear end elevation of the boiler, partly in section, on the broken line $x$ in Fig. 1. Fig. 4 represents in elevation, viewed exteriorly, a portion of one of the boiler-supporting water-legs, showing hand-holes and ends of retaining-rivets. This and all the remaining figures are drawn upon a scale larger than that employed in the three first figures. Fig. 5 is a vertical section of the part shown in Fig. 4, taken on the broken line $x$ in that figure, and representing a hand-hole plate in longitudinal section. Fig. 6 is a view in side elevation of a portion of a flame-deflector, showing the nipple-connections and in section two water-tubes. Fig. 7 is a vertical section of the parts shown in Fig. 6, taken on the broken line $x$ therein, and showing a water-tube passing through the connecting-thimbles. Fig. 8 is a view in side elevation of the upper end of deflector $B^2$. Fig. 9 is a vertical section of the part shown in Fig. 8, taken on the broken line $x$ in that figure, showing a water-tube expanded into one of the deflector-plates and representing a hand-hole plate in cross-section. Fig. 10 is a vertical cross-section of the steam-tube, taken on the broken line $z$, and showing the ends of the nipples connecting it with one of the plates of the rear leg. Fig. 11 is a central longitudinal section of the tube shown in Fig. 10, taken on broken line $x$ and detached from the leg. Fig. 12 is a view similar to that of Fig. 11, showing modified form of head for the steam-tube. Fig. 13 is a rear elevation of the leg-supporting truck with the leg detached. Fig. 14 is a vertical cross-section of same, taken on the broken line $x$ in Fig. 13, and showing the lower part of the leg-plates attached. Fig. 15 is an exterior view (plan) of a hand-hole plate detached. Fig. 16 is a vertical cross-section of same, taken at the broken line $x$ in Fig. 15. Fig. 17 is a cross-sectional view, on an enlarged scale, of the left-hand end of the hand-hole plate, as shown in Fig. 16, bearing against lead packing interposed between it and the main plate in which the hand-hole is made. Fig. 18 represents a slightly-modified form of the device shown in Fig. 17.

The boiler is supported upon suitable foundations A by the front leg B, rear leg B', and flame-deflectors $B^2$ and $B^3$, the latter being supported by the inclosing side walls A and the former taking the place of the usual bridge-wall. The front leg and deflector $B^2$ serve to support a fuel-grate $A^2$, which may be constructed in any well-known manner and provided with the usual doors $A^3$ and $A^4$, closing openings through the front leg. The legs and deflectors are each made of rolled metallic plates, preferably steel, riveted to each other in pairs, as hereinafter fully described, to form a water-tight chamber.

The water-tubes C lead from the water-chamber in one leg to that in the other, the ends of the tubes being inserted through receiving-apertures in the inner plates forming the legs and expanded therein to make a water-tight joint.

The deflectors are provided with short thimbles C', the ends of which are expanded in receiving-apertures in the respective plates to make a water-tight joint. The thimbles have an inner diameter slightly exceeding the outer diameter of the water-tubes, so that the tubes can be easily passed through them and secured in the legs, as shown in Fig. 1.

The apertures in the legs which receive the ends of the tubes are preferably arranged in quincunx order, as shown in Figs. 2 and 3, so that the individual tubes in each successive horizontal row are above the spaces between the individual tubes in the row beneath, thus causing the flames and heated gases to take a zigzag course in passing through the rows of tubes.

The boiler is supplied with water at three inlets D, one in the lower end of the rear leg and one in the lower end of each of the deflectors.

The flames and heated gases travel from the grate in the direction of the arrows shown in Fig. 1, up over the deflector $B^2$, beneath the deflector $B^3$, and out over the top of the rear leg.

It is evident that a great amount of heat is communicated to the water inclosed in the chambers in the legs and deflectors. The heated water expands and rises in the rear leg to the tubes C, and the latter being inclined, as shown, the water continues to rise and circulate upwardly of the tubes until it passes over the grate and into the front leg, then up the latter and into the tube $C^2$, when it begins to vaporize and passes into and along the upper end of the rear leg, and thence as steam into the steam-tube $C^3$, along which it travels over the grate again to the superheating steam-drum $C^9$, when it is ready for use.

A comparatively small amount of water is admitted to the bottoms of the deflectors to keep the metal from becoming excessively hot, and to utilize the heat absorbed by the metal. The water in deflector $B^3$ circulates to the upper end and through tubes $C^4$ into the upper end of the rear leg, where it vaporizes, while that entering deflector $B^2$ circulates through tubes $C^5$ into the front leg and mingles with that emitted from tubes C.

I am well aware that inclined legs provided with water-chambers have been connected by inclined water-tubes passing over the grate and leading to a steam drum or dome, but the legs were made up of cast-iron boxes laid one upon another and connected by nipples, the tubes being made of rolled or drawn metal, and experience shows that the unequal expansion of the wrought and cast metals makes it impossible to construct a durable water-tube boiler with the legs formed of cast-iron.

My improvement consists in making the legs, as well as the deflectors, of rolled or wrought metal plates—that is, of a metal substantially homogeneous with that of the tubes—and in the details of construction which will now be more fully described.

As will be seen by reference to Figs. 4 and 5, the legs are made up of the two plates $a$ and $b$, which are held together by numerous rivets $d$. These rivets pass through sleeves $d'$, the ends of which form shoulders serving to keep the plates separate from each other the required distance, while the rivets are headed down and prevent the plates from spreading. The rivets may be threaded their whole length, as shown in Fig. 9, and inserted through correspondingly-threaded apertures in the plates, thereby preventing any movement of the plates relatively to each other.

It is preferable to insert and expand the water-tubes in one plate of the legs after the legs are formed, and I provide hand-holes $a'$ in the outer plates, each hand-hole being cut obliquely in order to render two of the tube ends accessible through one hole. By means of these hand-holes I not only render accessible the ends of the tubes for expanding, but for cleaning and inspection, as well as removal. The hand-holes are covered by a hand-hole plate $a^2$, resting upon the inner side of the edge walls of the plate surrounding the hand-hole, as shown in Figs. 5 and 9. The heads of the bolts $a^3$, inserted at $a^4$, are slid to the ends of slot $a^5$ and the stems inserted through the bolt-holes in saddle $a^6$, the ends of which rest upon the outer side of the plate, and nuts $a^7$, turned upon the threaded ends of the bolts to draw the hand-hole plates closely against the leg-plates. I prefer to provide the edge of the hand-hole plates with one or more grooves $a^8$ in and along its face edge to receive and retain in position a soft-metal packing $a^9$, which may be a ring made in the form of the plate and pressed between the two plates, as shown in Figs. 17 and 18.

No particular form or number of grooves $a^8$ is required. I have shown two angular grooves in Fig. 17 and two curved ones in Fig. 18.

In Figs. 6 and 7 I have shown on enlarged scale the method of forming the deflectors. They are composed of two plates, the same as the legs, and secured together in substantially the same manner, except that the thimbles $C'$ serve to strengthen and keep the plates from spreading. The plates $a$ and $b$ are secured together at their edges by flanged strips $b'$, which may be riveted to the edges of the plates, as shown at rivet $b^2$, or welded thereto, as shown at $b^3$ in Figs. 7 and 9. It will be seen by reference to Fig. 1 that I have provided hand-holes opposite every tube end, which permits of ample facilities for cleaning or repairing the pipes, as well as a more perfect expansion of the joints during the process of construction. I show a horizontal hand-hole opposite the thimbles $C^6$, which connect the rear leg with the steam-pipe $C^3$, as shown in Fig. 1.

I have shown on larger scale in Figs. 10, 11, and 12 the method of connecting the rear leg with the steam-pipe. Two short nipples $C^6$ are first expanded at one end in the head $C^7$ of the steam-pipe, and then the other ends, which project from the head of the steam-pipe, are inserted in their receiving-apertures in the leg-plate $b$ and expanded through the opposite hand-hole in the upper end of plate $a$ of the rear leg. The head of the steam-pipe may be inserted in any well-known manner. In Fig. 11 I have shown it welded in without any angular flange, and in Fig. 12 provided with an angular flange turned both inwardly and outwardly. The steam-pipe $C^3$ may be secured to the steam-drum C⁸ in substantially the same manner as the rear leg, as shown in Fig. 1. The rear leg is supported by a truck resting upon the foundation-plate g, which permits the leg to travel back and forth as the water-tubes expand and contract. Any well-known form of truck may be employed; but as this movement is very small I prefer a simple roller g', resting upon the plate g, and supporting on its upper surface the truck-frame g², supporting the leg-plates, substantially as shown. The roller is prevented from getting out of place by the lugs g³ on the truck-frame, which straddle the roller and diverge from each other sufficiently to permit of a slight rolling movement of the roller on the truck-frame The man-holes F in the side wall of the boiler-inclosure render all parts of the interior easily accessible for cleaning and repairs.

The plates forming the water-chamber in the rear leg are, one or both of them, bent at their lower end, so as to diverge from each other and form an enlarged space, which serves to collect the refuse matter, and may be called the "mud-chamber." In the outer plate, which forms this enlargement, are provided a hand-hole through which the mud-chamber is rendered accessible, as shown, for the purpose of cleaning.

In a boiler having a series of water-tubes grouped together directly over the boiler-heating fire I am able, with very little or no expense, to easily and positively eliminate the element of danger due to explosion. I simply make one or more of the water-tubes, preferably located centrally of the lower part of the group of tubes composing the boiler, weaker than the others. The weaker tubes are tested to resist a greater pressure than that required in the normal use of the boiler, while all the other water and steam tubes, pipes, and drum, are tested to resist a still greater pressure. It is obvious, therefore, that if the pressure in any part of the boiler should for any reason exceed the resisting capacity of the latter it would yield at the weakest point—viz., the weaker water-tube, located immediately over the fire. As the tubes so located are always filled with water, and comparatively cold water, only water could escape which would quickly put out or deaden the fire, and thus reduce the steam-pressure of the boiler and keep it below the danger-point, with little or no damage except to destroy a single water-tube and extinguish the fire under the boiler.

By locating the weak tube in that part of the boiler directly above the grate and over the fire, in event of the bursting of said tube, water is admitted into the fire-box and thus extinguishes the fire.

What I claim as new, and desire to secure by Letters Patent, is—

1. A water-tube steam-boiler consisting of a group of inclined water-tubes, a single water-chamber at each end of the group, into which the individual tubes all open, formed from sheets of wrought metal united at their edges and centrally cross-stayed, a row of horizontal water-tubes connecting the upper parts of the water-chambers with each other, a steam-drum and connections leading thereto from the upper part of one of the water-chambers, water-supply pipes leading into the lower part of one of the water-chambers, fire-grate, and grate and boiler supporting inclosure, and a flame-deflector extending transversely of the group of water-tubes, consisting of sheets of wrought metal united at their edges to form a single water-chamber having a lower supply and upper discharge pipe and centrally cross-stayed and provided with tube-receiving thimbles passing transversely through the chamber, substantially as described.

2. In a water-tube boiler, the combination, with inclined water-tubes supported at their ends by front and rear legs, of a flame-deflector consisting of metal plates secured together to form a water-chamber by tube-receiving thimbles passing through the chamber, inlet water-connections leading to the water-chamber of the deflector, and outlet-connections leading to the steam-pipe, substantially as described.

3. In a water-tube boiler having a front and rear water-chamber leg and a superheated steam-drum, a steam-tube having solid welded heads, and expanded nipple-connections by which one end of the tube is connected with one of the leg-chambers and the other end with the steam-drum, substantially as described.

4. The combination of the front and rear water-legs, the water-tubes connecting the same, and the hollow water-containing flame-deflector between said legs, with the steam-drum located between the front leg and deflector, above the grate, and communicating only with the rear water-leg, substantially as and for the purpose set forth.

5. The combination of the front and rear water-legs, the intermediate hollow water-holding flame-deflector, and the grate supported on said deflector and front leg, with the inclined water-tubes connecting the front and rear legs and passing through the deflector, but not communicating therewith, substantially as specified.

6. The combination of the front and rear water-legs and the intermediate water-chamber flame-deflectors, with the water-tubes connecting said legs and passing through the upper portion of one deflector and through the lower portion of the opposite deflector, but not communicating with either, substantially as and for the purpose described.

7. The combination of the stationary front water-leg and the rear water-leg having an enlarged mud-chamber at bottom and mounted on a movable support, with the water-tubes connecting said legs, the flame-deflector, the steam-drum located between the front leg and deflector, and the connections between said drum and rear water-leg, substantially as specified.

8. In a boiler, a water-circulating tube located above the grate and in the water-space of the boiler and formed to be of less strength than the other parts of the boiler, whereby it will break when subjected to undue steam-pressure without danger or injury to other portions of the boiler, substantially as and for the purpose set forth.

9. The combination of the front and rear water-legs and the intermediate hollow water-holding deflectors provided with horizontal hand-holes at their upper ends, with the tubes connecting the said deflectors respectively with the front and rear legs at points opposite said hand-holes, and the water-tubes connecting the front and rear legs and passing through the deflectors, substantially as and for the purpose set forth.

10. The combination of the front and rear water-legs, the intermediate water-holding deflectors, the water-tubes connecting said legs and passing through said deflectors, but not communicating therewith, with the steam-tubes leading from the deflectors and front leg to the top portion of the rear leg, and the steam drum and pipe located above the deflectors and tubes and communicating with the top of the rear water-leg also, all substantially as set forth.

11. The combination, in a tubular boiler, of the water-legs and steam-drum, with a fragile water-tube located above the grate and connecting the water-legs of the boiler and constructed to be of less tensile strength than the remaining tubes, for the purpose and substantially as set forth.

12. The combination of the front and rear water-legs and the intermediate water-containing deflectors with the water-tubes connecting the legs, but not communicating with the deflectors, the tubes connecting said deflectors respectively with the front and rear legs, and the steam-drum communicating solely with the rear leg, substantially as specified.

13. A hollow water-leg for tubular boilers, having its inner plate perforated in staggered order for the reception of the ends of the water-tubes and its outer plate provided with oblique hand-holes, substantially as and for the purpose specified.

14. The combination of the front water-leg, the rear water-leg having an enlarged mud-chamber at bottom and resting on a movable support, the water-chamber deflectors between said legs, the water-tubes passing through and not communicating with said deflectors and connecting the front and rear legs, the water-supply pipes to said legs and deflectors, the steam-drum located between the front legs and deflector above the grate, the steam-tube connecting said drum with the rear leg, and the steam-connections between said legs and deflectors, all substantially as set forth.

15. A water-leg for tubular boilers, composed of wrought-metal plates riveted together to form water-tight chambers, the inner plate having openings in it for the reception of the water-tube ends made in staggered order, and the outer plate having oblique hand-holes opposite a pair of openings in the inner plate, in combination with the obliquely-arranged hand-plates closing said holes, all substantially as specified.

In testimony whereof I have hereunto set my hand this 30th day of May, 1888.

JOHN TAYLOR.

Witnesses:
GEO. A. MOSHER,
CHAS. L. ALDEN.